US005488698A

United States Patent [19]

Oliver et al.

[11] Patent Number: 5,488,698

[45] Date of Patent: Jan. 30, 1996

[54] RASTERIZATION OF LINE SEGMENTS USING DIFFERENCE VECTORS

[76] Inventors: David C. Oliver, 11146 Vance Johnson #2503, San Antonio, Tex. 78230-2560; Michael J. Petrillo, 1240 Waldo Way, Twinsburg, Ohio 44087

[21] Appl. No.: 972,113

[22] Filed: Nov. 5, 1992

[51] Int. Cl.[6] ...................... G06F 15/00

[52] U.S. Cl. .................. 395/110; 395/143; 395/141; 395/101

[58] Field of Search .................. 395/102, 110, 395/114, 115, 116, 134, 135, 142, 143, 147, 275, 100, 101, 118, 139–143; 340/720, 747, 724; 345/10, 11, 12, 94, 95, 133, 134, 147; 382/9, 21, 22, 23, 24

[56] References Cited

U.S. PATENT DOCUMENTS

| | | | |
|---|---|---|---|
| Re. 31,200 | 4/1983 | Sukonick et al. | 395/134 |
| 4,039,784 | 8/1977 | Quarton et al. | 235/151 |
| 4,205,389 | 5/1980 | Heartz | 395/275 |
| 4,251,815 | 2/1981 | Dagostino | 340/722 |
| 4,536,760 | 8/1985 | Navarro et al. | 340/722 |
| 4,777,651 | 10/1988 | McCann et al. | 382/21 |
| 4,855,935 | 8/1989 | Lien et al. | 364/521 |
| 5,028,914 | 7/1991 | Povenmire | 395/143 |
| 5,115,404 | 5/1992 | Lo et al. | 395/143 |
| 5,125,073 | 6/1992 | Lien et al. | 395/142 |
| 5,283,596 | 2/1994 | Long | 345/134 |

*Primary Examiner*—Raymond J. Bayerl
*Assistant Examiner*—Tracy M. Legree

[57] ABSTRACT

A system for processing image data including a plurality of groups of dam values includes a memory for storing at least one difference vector for controlling an output of a display; means for generating each of the difference vectors as a function of a minimum data value and a maximum dam value included within a corresponding group of the clam values; and means for outputting each difference vector from the memory means to produce an image on a display.

17 Claims, 8 Drawing Sheets

| DATA GROUP | MIN-MAX |
|---|---|
| 1 | 10, 15 |
| 2 | 12, 16 |
| 3 | 2, 12 |
| 4 | 2, 3 |
| 5 | 3, 5 |

| ADDRESS | 0 | 1 | 2 | 3 | 4 | 5 | 6 | 7 | 8 | 9 | 10 | 11 | 12 | 13 | 14 | 15 | 16 | 17 | 18 | 19 | 20 | ... |
|---|---|---|---|---|---|---|---|---|---|---|---|---|---|---|---|---|---|---|---|---|---|---|
| VECTOR | | | | | | | | | | | | | | | | | | | | | | ... |
| 1 ODD | 0 | 0 | 0 | 0 | 0 | 0 | 0 | 0 | 0 | 0 | +1 | 0 | 0 | 0 | 0 | 0 | −1 | 0 | 0 | 0 | 0 | ... |
| 2 EVEN | 0 | 0 | 0 | 0 | 0 | 0 | 0 | 0 | 0 | 0 | 0 | 0 | +1 | 0 | 0 | 0 | 0 | −1 | 0 | 0 | 0 | ... |
| 3 ODD | 0 | 0 | +1 | 0 | 0 | 0 | 0 | 0 | 0 | 0 | 0 | 0 | 0 | −1 | 0 | 0 | 0 | 0 | 0 | 0 | 0 | ... |
| 4 EVEN | 0 | 0 | +1 | 0 | −1 | 0 | 0 | 0 | 0 | 0 | 0 | 0 | 0 | 0 | 0 | 0 | 0 | 0 | 0 | 0 | 0 | ... |
| 5 ODD | 0 | 0 | 0 | +1 | 0 | 0 | −1 | 0 | 0 | 0 | 0 | 0 | 0 | 0 | 0 | 0 | 0 | 0 | 0 | 0 | 0 | ... |
| ACCUM. 3 | 0 | 0 | 1 | 1 | 1 | 1 | 1 | 1 | 1 | 1 | 1 | 1 | 1 | 0 | 0 | 0 | 0 | 0 | 0 | 0 | 0 | ... |
| PEN OUTPUT | F | F | T | T | T | T | T | T | T | T | T | T | T | F | F | F | F | F | F | F | F | ... |

SAMPLE OUTPUT

FIG. 6

| ADDRESS | 0 | 1 | 2 | 3 | 4 | 5 | 6 | 7 | 8 | 9 | 10 | 11 | 12 | 13 | 14 | 15 | 16 | 17 | 18 | 19 | 20 | ... |
|---|---|---|---|---|---|---|---|---|---|---|---|---|---|---|---|---|---|---|---|---|---|---|
| VECTOR | | | | | | | | | | | | | | | | | | | | | | ... |
| 1 ODD | 0 | 0 | 0 | 0 | 0 | 0 | 0 | +1 | 0 | 0 | +1 | 0 | 0 | 0 | 0 | 0 | −1 | 0 | 0 | −1 | 0 | ... |
| 2 EVEN | 0 | 0 | 0 | 0 | 0 | +1 | 0 | 0 | 0 | 0 | 0 | 0 | +1 | 0 | 0 | 0 | 0 | −1 | 0 | −1 | 0 | ... |
| 3 ODD | 0 | 0 | +1 | 0 | +1 | 0 | 0 | −1 | 0 | 0 | 0 | 0 | 0 | −1 | 0 | 0 | 0 | 0 | 0 | 0 | 0 | ... |
| 4 EVEN | 0 | 0 | +1 | 0 | −1 | 0 | +1 | 0 | 0 | 0 | −1 | 0 | 0 | 0 | 0 | 0 | 0 | 0 | 0 | 0 | 0 | ... |
| 5 ODD | 0 | 0 | 0 | +1 | 0 | 0 | −1 | +1 | 0 | 0 | −1 | 0 | 0 | 0 | 0 | 0 | 0 | 0 | 0 | 0 | 0 | ... |

FIG. 10

| CHANNEL A | | CHANNEL B | |
|---|---|---|---|
| DATA GROUP | MIN-MAX | DATA GROUP | MIN-MAX |
| 1 | 10, 15 | 1 | 7, 18 |
| 2 | 12, 16 | 2 | 5, 18 |
| 3 | 2, 12 | 3 | 4, 6 |
| 4 | 2, 3 | 4 | 6, 9 |
| 5 | 3, 5 | 5 | 7, 9 |

SAMPLE OUTPUT FOR RASTER LINE POSITION 3

| ADDRESS (+4K) | 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|
| VECTOR 3 | 0 | 0 | +1 | 0 | +1 | 0 | 0 | −1 | 0 | 0 | 0 | 0 | 0 | −1 | 0 | 0 | 0 | 0 | 0 | 0 | 0 |
| ACCUM. OUT | 0 | 0 | 1 | 1 | 2 | 2 | 2 | 1 | 1 | 1 | 1 | 1 | 1 | 0 | 0 | 0 | 0 | 0 | 0 | 0 | 0 |
| PEN OUTPUT | F | F | T | T | **T** | **T** | **T** | T | T | T | T | T | T | F | F | F | F | F | F | F | F |

FIG. 12

| ADDRESS | 0 | 1 | 2 | 3 | 4 | 5 | 6 | 7 | 8 | 9 | 10 | 11 | 12 | 13 | 14 | 15 | 16 | 17 | 18 | 19 | 20 | ··· |
|---|---|---|---|---|---|---|---|---|---|---|---|---|---|---|---|---|---|---|---|---|---|---|
| VECTOR | | | | | | | | | | | | | | | | | | | | | | ··· |
| 1 ODD | 0 | 0 | 0 | 0 | 0 | 0 | 0 | +2 | 0 | 0 | +1 | 0 | 0 | 0 | 0 | 0 | −1 | 0 | 0 | −2 | 0 | ··· |
| 2 EVEN | 0 | 0 | 0 | 0 | 0 | +2 | 0 | 0 | 0 | 0 | 0 | 0 | +1 | 0 | 0 | 0 | 0 | −1 | 0 | −2 | 0 | ··· |
| 3 ODD | 0 | 0 | +1 | 0 | +2 | 0 | 0 | −2 | 0 | 0 | 0 | 0 | 0 | −1 | 0 | 0 | 0 | 0 | 0 | 0 | 0 | ··· |
| 4 EVEN | 0 | 0 | +1 | 0 | −1 | 0 | +2 | 0 | 0 | 0 | −2 | 0 | 0 | 0 | 0 | 0 | 0 | 0 | 0 | 0 | 0 | ··· |
| 5 ODD | 0 | 0 | 0 | +1 | 0 | 0 | −1 | +2 | 0 | 0 | −2 | 0 | 0 | 0 | 0 | 0 | 0 | 0 | 0 | 0 | 0 | ··· |

FIG. 13

| ADDRESS | 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|
| VECTOR 2 | 0 | 0 | 0 | 0 | 0 | +2 | 0 | 0 | 0 | 0 | 0 | 0 | +1 | 0 | 0 | 0 | 0 | −1 | 0 | −2 | 0 |
| ACCUM. OUT | 0 | 0 | 0 | 0 | 0 | 2 | 2 | 2 | 2 | 2 | 2 | 2 | 3 | 3 | 3 | 3 | 3 | 2 | 2 | 0 | 0 |
| PEN OUTPUT | F | F | F | F | F | $T_2$ | $T_2$ | $T_2$ | $T_2$ | $T_2$ | $T_2$ | $T_2$ | $T_3$ | $T_3$ | $T_3$ | $T_3$ | $T_3$ | $T_2$ | $T_2$ | F | F |

FIG. 14

RASTERIZATION OF LINE SEGMENTS USING DIFFERENCE VECTORS

TECHNICS FIELD

The present invention relates generally to systems for displaying image dam and, more particularly, to a rasterization system for displaying image data using difference vectors.

BACKGROUND OF THE INVENTION

The display of image data using a raster display is known in the art. Typically, image data is acquired and stored in a digital memory. The image data is subsequently processed and outputted to a raster display where the image appears on the raster display as a sequence of raster line segments. Examples of raster displays include XY recorders, oscilloscope chart recorders, pen recorders, etc.

An existing technique for displaying image data on a raster display includes grouping the image dam in contiguous groups and using the minimum data value and maximum data value in each group to generate a series of line segments on the raster display. For example, FIG. 1 illustrates an analog waveform 20 input signal which is to be displayed on a raster display. The wave/form 20 is sampled and digitized using conventional means to form a set of image data values represented in FIG. 1 by "X"s. The data values are stored in a digital memory and are grouped contiguously with respect to time, for example, to form groups of data values 1–5 as shown. Each group of data values corresponds to the data values which are to be combined to form a raster line segment on the raster display. FIG. 1 illustrates there being three data values in each group, although it will be appreciated that any desired number of data values can be included in each group, the exact number typically being a function of the desired compression ratio.

In order to generate the corresponding line segment on the raster display for each group of data values, the image data is further processed using known minimum-maximum data processing techniques. In particular, the minimum data value and maximum data value for each group of data values is initially determined. For example, FIG. 2 provides a listing of the minimum data value and maximum data value (also referred to herein as the "min-max" pair) for each of groups 1–5. As is noted, the min-max pair for group 1 is 10 and 15, denoted herein as (10,15). Similarly, the min-max pair for group 2 is (12,16), group 3 is (2,12), etc.

The min-max pair for each group is used to produce a raster line segment on the raster display extending from the minimum data value to the maximum data value. More particularly, the min-max pair for each group of data values is used to control the output device on the raster display, e.g., the "pen" on a pen recorder type raster display, the pixels on a digital raster display, etc., in order to produce a series of line segments forming the image represented by the image data. Using this technique, a raster display such as that shown in FIG. 3 is generated. The horizontal axis in FIG. 3 represents the raster line position on the raster display, and each raster line position corresponds to the group of data values used to generate a raster line segment 25 at that particular position. Each raster line segment 25 consists of a line segment extending from the minimum data value to the maximum data value represented by the min-max pair of a corresponding group of data values. As an example, the raster line segment 25 at the raster line position 1 extends from the minimum data value= 10 to the maximum data value=15. The raster line segment 25 at the raster line position 2 extends from the minimum data value=12 to the maximum data value= 16, and so on. As a result, a more continuous appearing waveform will appear on the raster display as will be appreciated.

There are, however, several drawbacks associated with existing rasterization systems for providing a raster display based on min-max pairs such as described above. For example, FIG. 4 illustrates in part a rasterization system 30 for generating a series of raster line segments on the raster display. Each raster line segment for a given raster line position is represented by a pair of registers **31*a* and 31*b* which hold, respectively, the corresponding minimum data value and maximum data value. The registers 31*a* and 31*b* each include a corresponding comparison circuit 32*a* and 2*b* connected to a common raster scan position counter 35. For each raster line position, the raster scan position counter 35 counts or "scans" through a set of values which correspond to the respective raster scan positions on the vertical axis of the raster display as is shown in FIG. 3**.

The comparison circuit **32*a* compares the value of the minimum data value in the register 31*a* to the output value of the raster scan position counter 35 and produces a "true" output on line 36*a* when the value of the raster scan position counter 35 is greater than the minimum data value. Similarly, the comparison circuit 32*b* compares the value of the maximum data value in the register 31*b* to the value of the raster scan position counter 35 and produces a "true" output on line 36*b* when the value of the raster scan position counter 35 is less than or equal to the maximum data value. The outputs of the comparison circuits on lines 36*a* and 36*b* are ANDed together by an AND gate 37. As a result, the output of the AND gate 37 is "true" when the raster scan position counter 35 value is within the range of the min-max pair stored in the registers 31*a* and 31*b***.

The output of the OR gate 40 is suitable for controlling the pen on the raster display during a line scan, for example, so that the respective line segment or segments, in the case of a multichannel display, for each raster line position will be drawn on a recorder paper. When the output of the OR gate 40 is "true", the pen is placed in the down position so as to contact the paper and to draw a line segment 25 (FIG. 3). When the output of the OR gate 40 is "false", the pen is placed in the up position so as not to contact the paper, thus resulting in a line segment being drawn between the minimum and maximum data values.

To accommodate multiple channels, a pair of registers **31*a*, 31*b* and comparison circuits 31*a*, 31*b* have been required in the past for each channel of the raster display. The outputs of each AND gate 37 from each respective channel are ORed together by the OR gate 40. Thus, the OR gate 40 produces a "true" output when the value of the raster scan position counter 35 is within the range of the min-max pair for one or more of the channels. On the other hand, the OR gate 40 provides a "false" output whenever the value of the raster scan position counter 35** is not within the range of any of the min-max pairs.

One particular drawback associated with the rasterization system 30 is the requirement of a separate pair of registers and comparison circuits for each channel. As will be appreciated, such a requirement results in increased circuit complexity and cost. For example, the rasterization system 30 requires approximately one hundred logic gates for each channel. As a result, each channel requires substantial circuitry, board space, cost, etc.

Still another drawback associated with existing rasterization systems is that oftentimes it is difficult to distinguish overlapping raster line segments resulting from overlapping images from multiple channels. Referring again to the rasterization system 30 shown in FIG. 4, for example, the output of the OR gate 40 will be the same "true" value regardless of whether the position counter 35 output value falls within the min-max pair of one or multiple channels. Therefore, overlapping line segments are difficult to distinguish.

In view of the aforementioned shortcomings associated with existing rasterization systems, there is a strong need in the art for a rasterization system which is both inexpensive and simple in design. In particular, there is a strong need in the art for a rasterization system which is readily expandable and can accommodate additional channels while only requiring a relatively small increase in resources (e.g., circuitry, board space, cost, etc.). Furthermore, there is a strong need in the art for a rasterization system which can display overlapping line segments from multiple channels so as to be more readily distinguishable as compared to existing rasterization systems.

SUMMARY OF THE INVENTION

The present invention provides a simple, inexpensive rasterization system for processing image data for display on a raster display. More particularly, the present invention produces a raster image by processing a sequence of min-max pairs for one or more channels of image data to form a sequence of difference vectors. The difference vectors are used to generate corresponding raster line segments on a raster display as a function of the vector element values contained within the difference vectors.

According to one particular aspect of the present invention, a system for processing image data comprising a plurality of groups of data values is provided, the system including memory means for storing at least one difference vector for controlling an output of a display; means for generating each of the difference vectors as a function of a minimum data value and a maximum data value included within a corresponding group of the data values; and means for outputting each difference vector from the memory means to produce an image on a display.

According to another aspect of the present invention, a system for processing image data comprising a plurality of groups of data values is provided, the system including means for generating a difference vector for controlling an output of a display as a function of a minimum data value and a maximum data value from a corresponding group of the data values; memory means for storing the difference vector; and means for outputting the difference vector from the memory means to produce image information on a display.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

Figure 7:
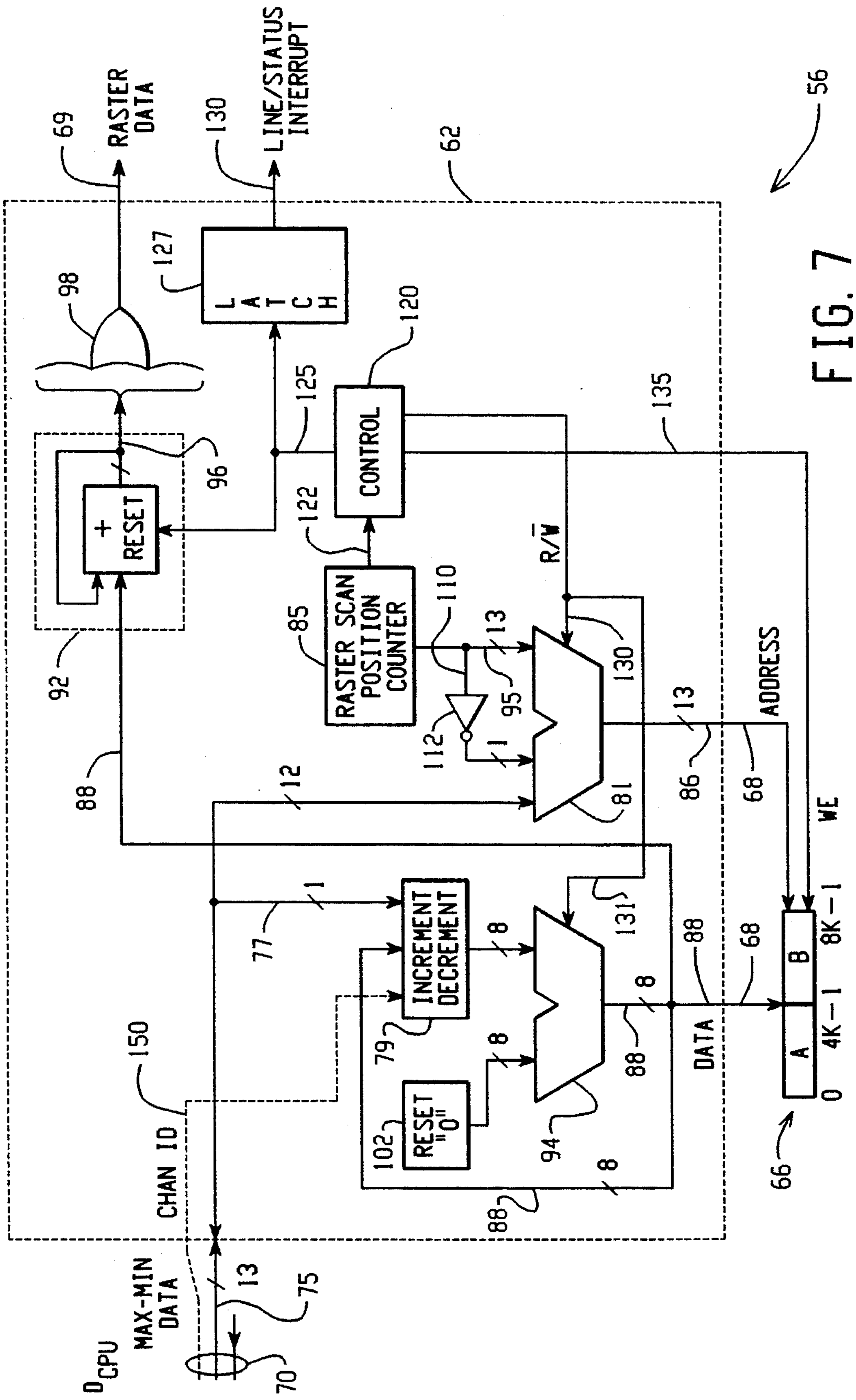
Figures 8, 9:
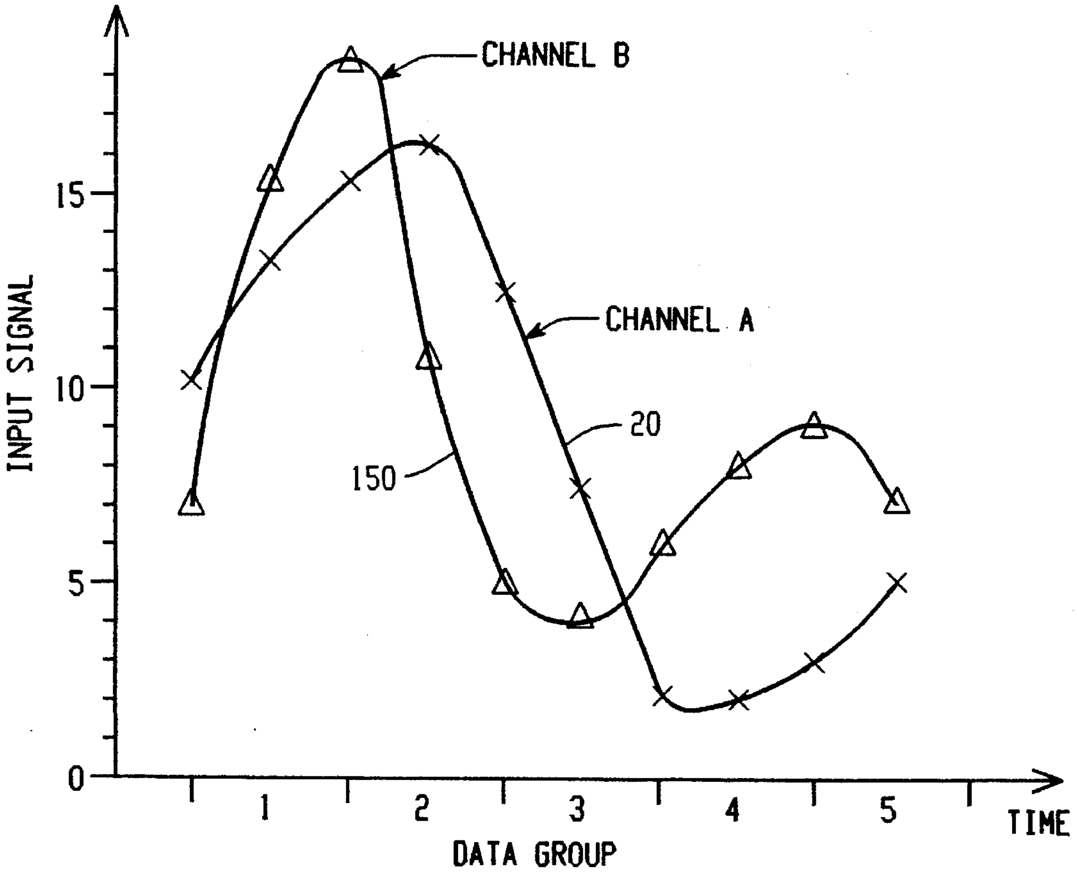
Figure 11:
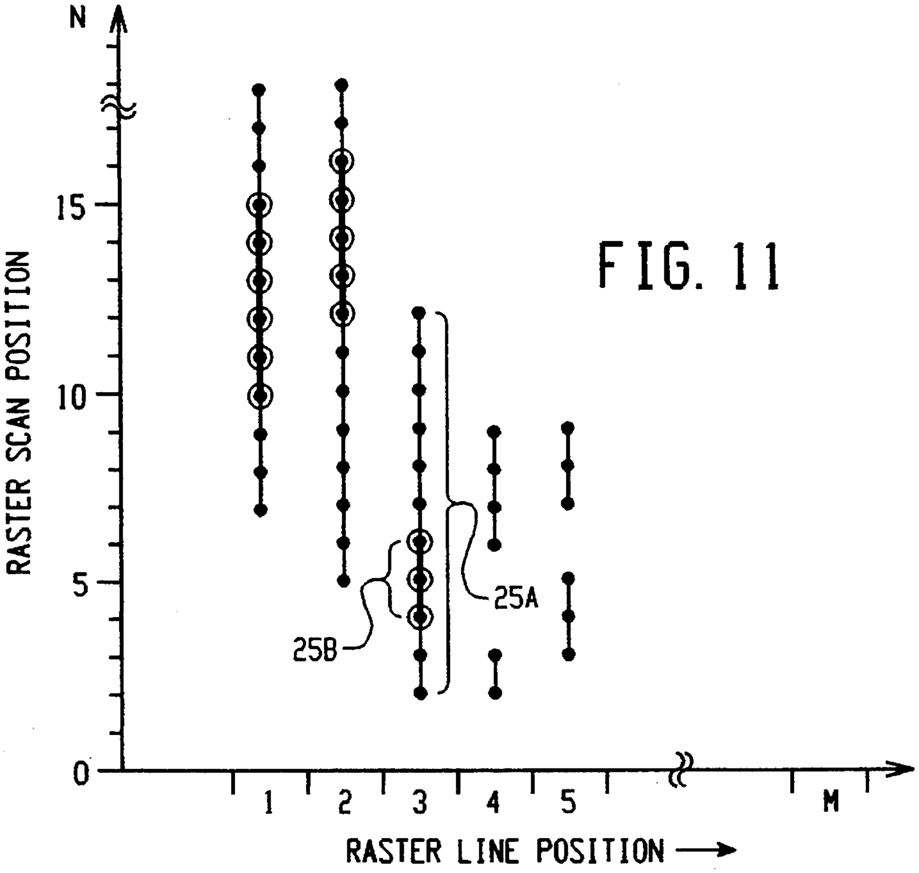
Figure 15:
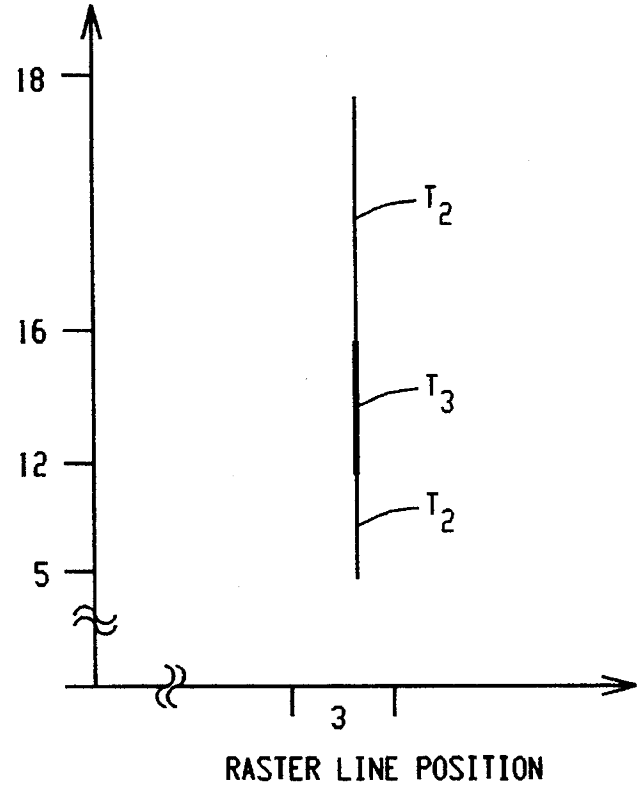

FIG. *5a* is a block diagram of a rasterization system in accordance with the present invention, FIG. *5b* represents a memory configuration for storing difference vectors in accordance with an embodiment of the present invention;

FIG. 6 illustrates a plurality of difference vectors sequentially generated in the memory of FIG. *5b* in accordance with the present invention;

FIG. 7 is a detailed block diagram of a rasterizer circuit included in the rasterization system of FIG. *5a* in accordance with the present invention;

FIG. 8 illustrates a pair of analog waveforms to be displayed on a raster display in accordance with a two-channel embodiment of the present invention;

FIG. 9 is a table of minimum data values and maximum data values for two channels of data values as is shown in FIG. 8;

FIG. 10 illustrates a plurality of difference vectors sequentially generated in : the memory configuration of FIG. *5b* in accordance with a two-channel embodiment of the present invention;

FIG. 11 represents a display of the waveforms shown in FIG. 8 in accordance with the present invention;

FIG. 12 illustrates a sample output of the rasterizer circuit in accordance with a two-channel embodiment of the present invention;

FIG. 13 illustrates a plurality of difference vectors sequentially generated in the memory configuration of FIG. *5b* in accordance with another two-channel embodiment of the present invention;

FIG. 14 illustrates a sample output of the rasterizer circuit in accordance with the difference vectors shown in FIG. 13; and FIG. 15 represents a partial display of the waveforms shown in FIG. 8 in accordance with the difference vectors shown in FIG. 13.

DESCRIPTION OF THE PREFERRED EMBODIMENT

A rasterization system in accordance with the present invention will now be described with reference to the drawings wherein like reference labels are used to refer to like elements throughout.

Referring initially to FIG. *5a*, a rasterization system 50 is shown according to one embodiment of the present invention. The rasterization system 50 includes an acquisition memory 52 for storing one or more channels of image dam, and a min-max generator 54 for determining the min-max pair for each group of data values included in the image data. The rasterization system 50 further includes a rasterizer 56 for generating a difference vector for each group of data values based on the corresponding min-max pair. The difference vectors are sequentially outputted from the rasterizer 56 and function to control the output of a raster display 58 so as to produce a raster image thereon. A central processing unit (CPU) 60 provides overall control within the rasterization system 50.

The rasterizer 56 includes a rasterizer circuit 62 which is connected to a random access memory (RAM) 66 via an address/data bus 68. The rasterizer circuit 62 receives the min-max pairs of data values for each channel of image data from the CPU 60 via a system bus 70 and generates a difference vector within the RAM 66 for a corresponding raster line position on the raster display 58. Furthermore, the rasterizer circuit 62 outputs each difference vector from the RAM 66 onto line 69 according to a predetermined buffering scheme to provide a sequence of control instructions to the raster display 58. More particularly, each difference vector provides a control instruction to produce a raster line segment or segments at a corresponding raster line position on the raster display 58 as will be appreciated in view of the following detailed description.

Figure 3:
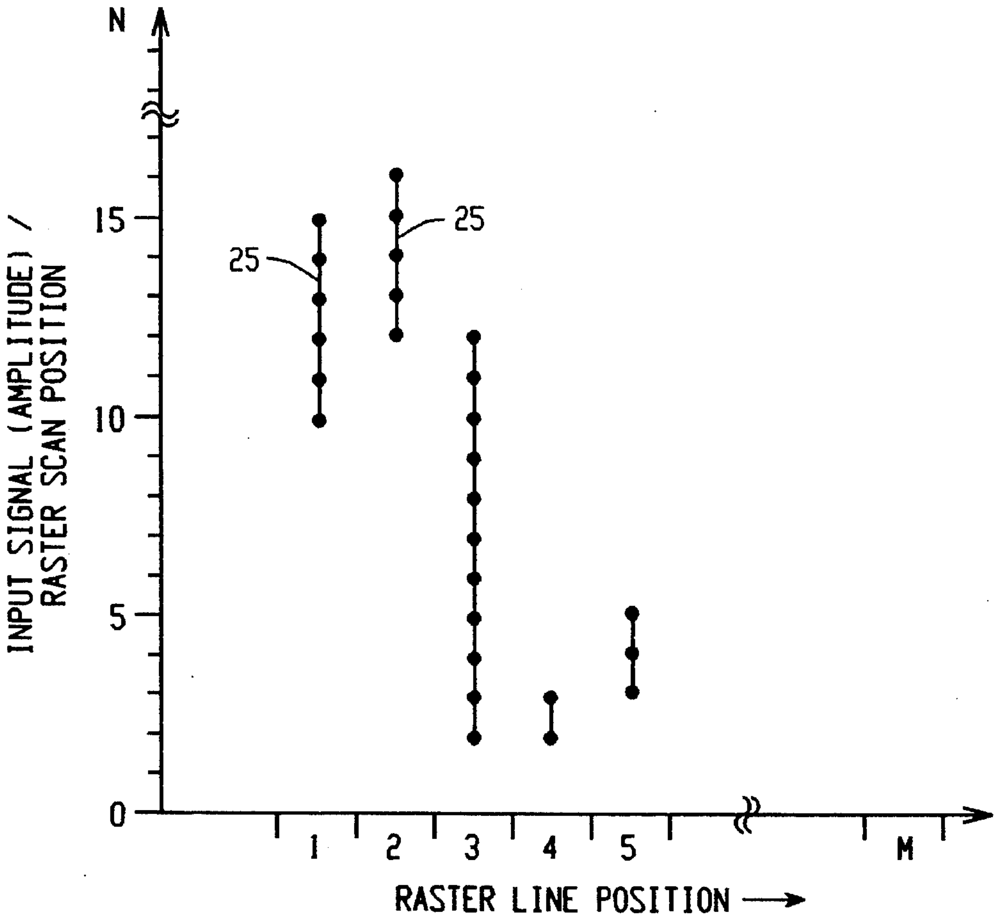
FIG. 3 represents a display of the waveform shown in FIG. 1 using min-max pairs of data values to generate corresponding line segments.
Figure 4:
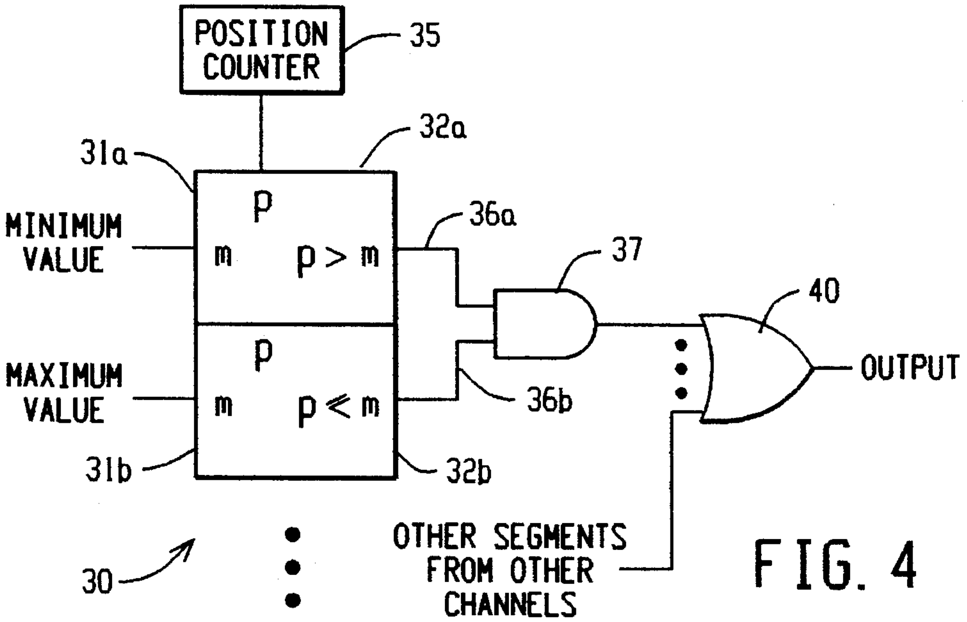
FIG. 4 is a partial block diagram of an existing rasterization system.

The raster display 58 in the exemplary embodiment includes a display frame which is made up of an M×N matrix of display elements (as is represented in FIGS. 3 and 11), where M represents the number of raster line positions in the display frame and N represents the number of raster scan positions in each raster line. As a result, the raster image as presented on the raster display 58 is made up of M raster lines each having a resolution of N display elements. The display elements can be, for example, discrete elements such as picture elements (pixels) on a liquid crystal display (LCD), digital storage oscilloscope, etc., or the X-Y location of a pen on an XY recorder. Alternatively, the display elements can be continuous, yet separately addressable, locations on a display such as on a vector scan display. As referred to herein, a raster display 58 refers to all such displays where the display elements are separately addressable based on M raster lines which are each scanned across N raster scan positions.

As is discussed in more detail below with respect to FIG. 5*b*, each difference vector generated by the rasterizer 56 in the RAM 66 includes N vector elements corresponding to the number of raster scan positions in a raster line. The values of the vector elements are generated by incrementing and decrementing initial values stored within the vector elements as a function of the min-max pair of data values for each channel. According to the preferred embodiment, the vector elements in the difference vector corresponding to a particular raster line position are accumulated to produce a control signal on line 69 during a raster scan. The control signal is used to turn "on" the display elements between the minimum data value and maximum data at the corresponding raster line position as represented in FIG. 3. For example, the control signal provided on line 69 during a raster scan controls the up/down position of a pen on a chart recorder, the electron beam in a cathode ray tube, the turning on/off of respective pixels on an LCD, etc., as will be appreciated.

Figures 1, 2:
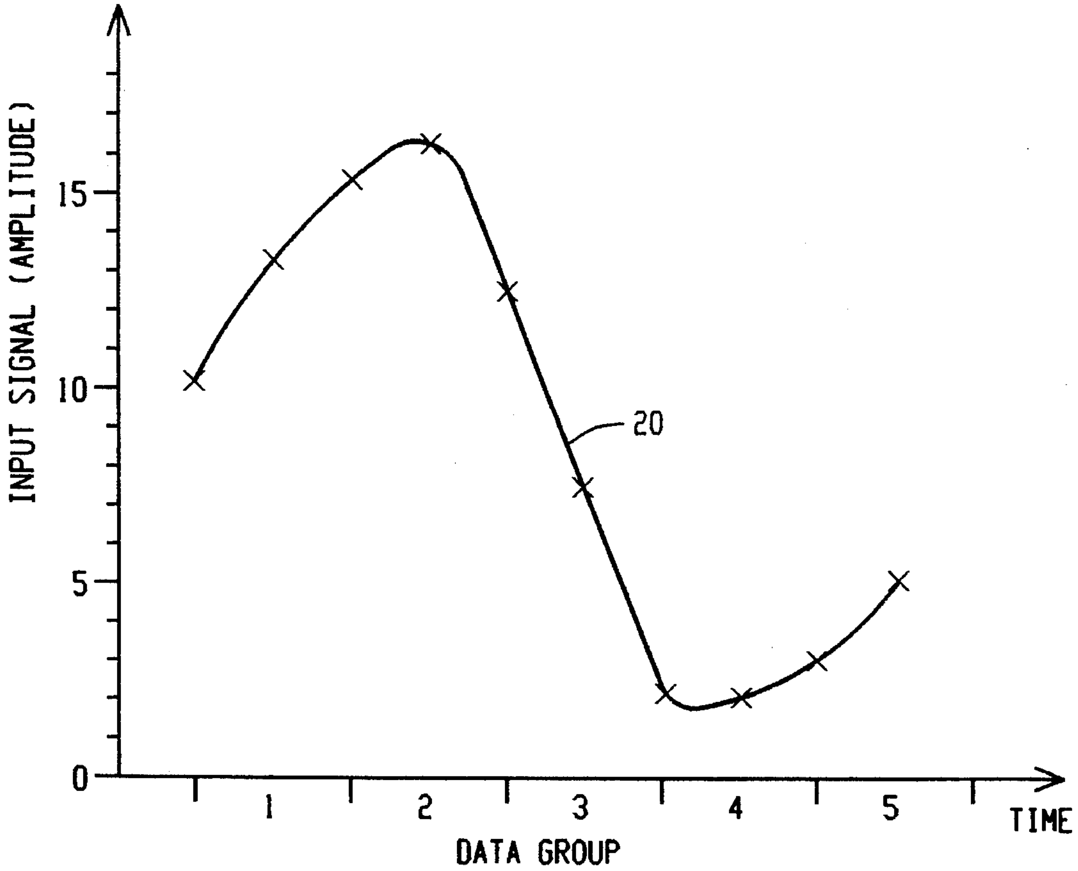
FIG. 1 represents an input signal in the form of an analog waveform to be displayed on a raster display.
FIG. 2 is a table of minimum data values and maximum data values for each group of data values as is shown in FIG. 1.

The acquisition memory 52 and the min-max generator 54 are coupled to the rasterizer circuit 56 and CPU 60 via the system bus 70 as is shown. The one or more channels of image data stored in the acquisition memory 52 typically are in the form of a sequence of data values representing an image such as a waveform, for example, as is shown in FIG. 1. In a two-channel embodiment, the image data may represent a pair of waveforms, for example, as is discussed below with respect to FIG. 8. Referring again to FIG. 5*a*, the image data in the acquisition memory 52 is obtained using conventional techniques such as an analog-to-digital converter (not shown). The exact manner in which the image data is obtained and stored in the acquisition memory 52 is not critical and is not intended to limit the scope of the present invention.

The min-max generator 54 determines the min-max pair for each group of data values for the respective channels of image data using known techniques. The min-max generator 54 provides the min-max pairs to the CPU 60 via the system bus 70 for delivery to the rasterizer circuit 56. The CPU 60 provides the min-max pairs to the rasterizer 56 via the system bus 70 according to a predetermined order. For example, in the preferred embodiment the CPU 60 inputs sequentially to the rasterizer 56 the min-max pairs for each channel of image data for each given group of data values prior to proceeding to the next group of data values. First, the minimum data value for a respective channel is input to the rasterizer 56. As a result, the rasterizer 56 increments the value of the vector element in the RAM 66 specified by the minimum data value as is described below. Second, the maximum data value for the same channel is input to the rasterizer 56 which, in turn, decrements the value of the vector element specified by the maximum data value. These steps are repeated for each channel of image data in a corresponding group of data values to generate a difference vector in the RAM 66 for each raster line position as is further described below.

The number of image data values which are to be grouped together for each channel when determining the min-max pairs is typically a function of the desired compression ratio of the rasterization system 50. Thus, the size of each group of data values is not intended to limit the scope the present invention. Moreover, the manner in which the min-max generator 54 determines the min-max pair of data values for each channel and group of data values is not critical to the present invention.

Figure 5A:
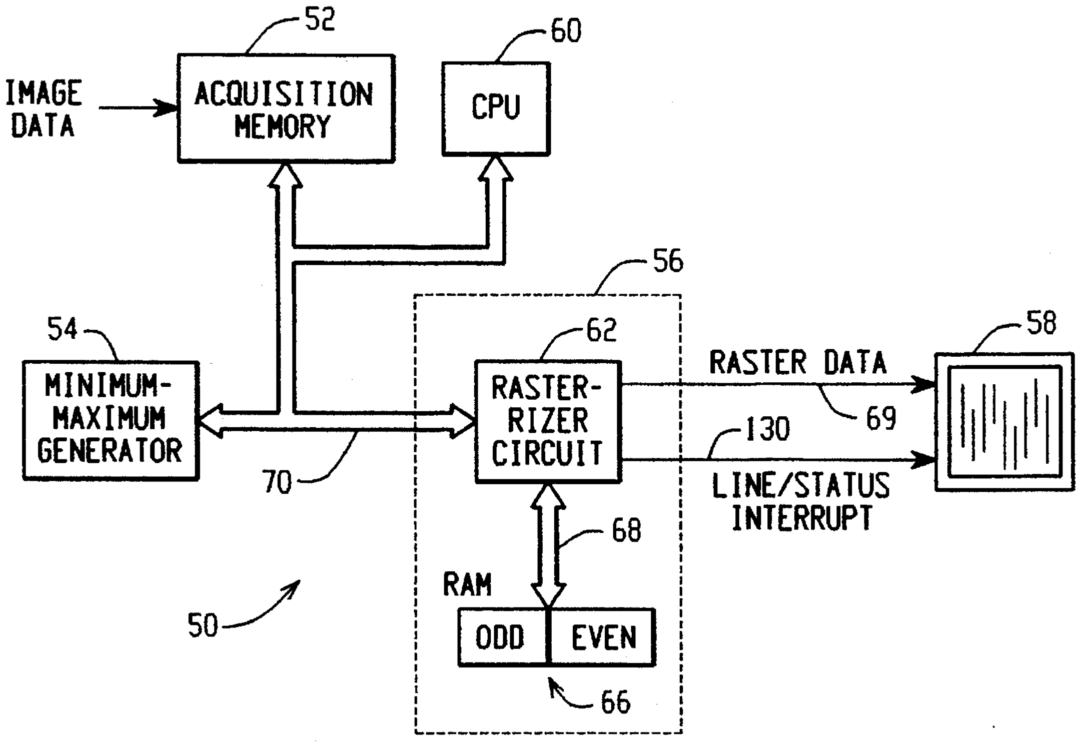
Figure 5B:
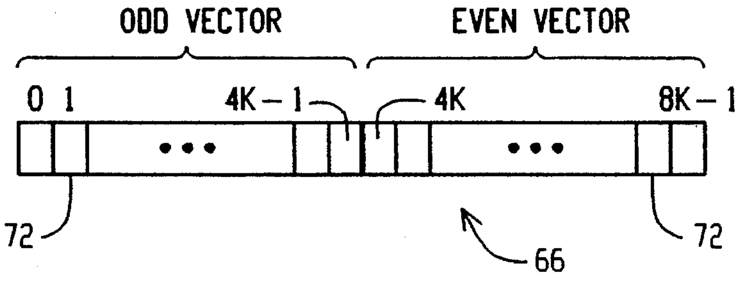

Referring now to FIG. 5*b*, the RAM 66 in which the difference vectors are generated for controlling the raster display 58 is shown. According to the exemplary embodiment, the RAM 66 is partitioned into two portions of memory. One portion of memory is for storing "odd" difference vectors for controlling the output of the raster display 58 at odd numbered raster line positions, and the other portion of memory is for storing "even" difference vectors for controlling the output of the raster scan display 58 at even numbered raster line positions. As will be explained in detail below, the rastefizer 56 in the exemplary embodiment uses a "ping-pong" buffering scheme in conjunction with the RAM 66 to generate and output sequentially "odd" and "even" difference vectors for controlling corresponding raster scans at odd and even numbered raster line positions in order to generate an entire display frame on the raster display 58.

In the exemplary embodiment, the RAM 66 is a conventional eight kilobyte RAM (e.g., 8K×8) for storing at any given time an odd difference vector and an even difference vector which are each four kilobytes in length. Each vector includes a plurality of vector elements 72, the number of vector elements 72 being equal to the number of raster scan positions on each line of the raster display 58. In the exemplary embodiment, the raster display includes M raster lines with N=4096 raster scan positions in each line. Thus, the RAM 66 in FIG. 5*b* is an eight kilobyte RAM capable of storing an odd and even difference vectors which are each four kilobytes in length. The difference vectors each include N=4096 vector elements 72, with each vector element 72 being a byte in length and corresponding to a respective raster scan position (e.g., display element) on the raster display 58. For example, the vector element at memory address "1" in the "odd" difference vector corresponds to the raster scan position "1" for odd numbered raster line positions on the raster display 58 (FIG. 3). Similarly, the vector element at memory address "4K–1" corresponds to the raster scan position "4095" on the raster display 58 for odd numbered raster line positions.

In the case of the "even" difference vector stored in the RAM 66, the memory addresses of the respective vector elements 72 are offset by four kilobytes. Thus, the vector element at the memory address "4K" corresponds to the raster scan position "0" for even numbered raster line positions on the raster display 58. Similarly, the vector element 72 at the memory address "8K–1" corresponds to the raster scan position "4095" for even numbered raster line positions.

Referring now to FIGS. 5*a* and 6, the manner in which the "odd" and "even" difference vectors are generated in the RAM 66 will be summarized with respect to the image data provided in FIGS. 1 and 2. Initially, the CPU 60 zeros all of the vector elements in the RAM 66. The CPU 60 then retrieves from the min-max generator 54 the min-max pair of data values for the group of image data values corresponding to the raster line position 1, i.e., the min-max pair (10,15). The CPU 60 first delivers the minimum data value "10" to the rasterizer circuit 62 via the system bus 70, and the value of the vector element 72 at the memory address specified by the minimum data value "10" is incremented by a "+1". The CPU 60 then delivers the maximum data value "15" to the rasterizer circuit 62 which decrements the value of the vector element 70 at the memory address specified by the maximum data value plus one. Thus, the vector element at the memory address 15+1=16 will be decremented by a "–1". The addition of "one" to the maximum data value can be handled by the CPU 60, for example, prior to delivery to the rasterizer circuit 62. As a result, the "odd" difference vector 1 as represented in FIG. 6 will be generated in the RAM 66 between the memory addresses 0 to 4K–1. This same procedure can be repeated for multiple channels of image data as is discussed below with respect to FIGS. 8–12.

Subsequently, the CPU 60 proceeds to retrieve from the min-max generator 54 the min-max pair of data values for the group of data values corresponding to the raster line position 2, i.e. (12, 16). Again the CPU 60 delivers the minimum and maximum data values to the rasterization circuit 62. Accordingly, the values of the vector elements at the memory addresses specified by the minimum data value and the maximum data value plus one are incremented and decremented, respectively. As a result, the difference vector 2 as represented in FIG. 6 will be generated in the RAM 66 between the memory address locations 4K to 8K–1. It will be appreciated that, as shown in FIG. 6, the memory addresses for the even numbered difference vectors are offset by 4K.

The above procedure is repeated for each of the groups of data values to produce a sequence of odd and even difference vectors 1–5 for the corresponding raster line positions as is exemplified in FIG. 6. In the preferred embodiment described below, a "ping-pong" buffering scheme is utilized in the RAM 66 wherein the "odd" difference vector is outputted from the RAM 66 to provide a control instruction on line 68 as the next "even" difference vector is generated in the RAM 66, and vice versa. Prior to each difference vector being generated, however, the vector elements 72 in the respective "odd" or "even" difference vector should be reset to zero as will be appreciated.

Referring now to FIG. 7, a detailed diagram of the rasterizer 56 is shown. The minimum and maximum data values for each group are provided sequentially by the CPU 60 to the rasterizer 56 as is described above via a data bus 75 portion of the system bus 70. In the preferred embodiment, the most significant bit on the data bus 75 is used as a min/max flag bit which is generated by the CPU 60 to indicate whether the data value being sent on the data bus 75 is a minimum data value or a maximum data value. The min/max flag bit is provided on line 77 to an increment/decrement circuit 79 which selectively increments or decrements the value of a vector element based on the bit status on line 77.

The minimum and maximum data values provided on the data bus 75 serve as an input to an address multiplexer 81, the other input to the address multiplexer 81 being provided by a raster scan position counter 85. The output of the multiplexer 81 is connected via the address portion 86 of the address/data bus 68 to the address input of the RAM 66. As will be appreciated, during a vector write operation whereby a difference vector is generated within the RAM 66, the address multiplexer 81 routes the address locations specified by the minimum data value and maximum data value plus one to the RAM 66 to increment and decrement the respective vector elements. During a vector output operation whereby a previously generated difference vector is outputted from the RAM 66 according to the "ping-pong" buffering scheme, the address multiplexer 81 directs the output of the raster scan position counter 85 to the RAM 66 so that the vector elements will be scanned sequentially from the RAM 66.

The data to and from the RAM 66 is communicated via the data bus portion 88 of the address/data bus 68. In particular, the data bus 88 is connected between the RAM 66 and an input of the increment/decrement circuit 79; an input of an accumulator 92; and the output of a data multiplexer 94. During a vector write operation, the vector element value at the address specified by the minimum data value or maximum data value plus one as delivered to the RAM 66 via the addressing multiplexer 81 is accessed from the RAM 66 and is output onto the data bus 88. The value of the accessed vector element is inputted to the increment/decrement circuit 79 where it is incremented or decremented based on the bit line status on line 77. The output of the increment/decrement circuit 79 is coupled to the other input of the data multiplexer 94. After being incremented or decremented, the modified vector element value is written back to the same vector element address from which it came via the data multiplexer 94.

During a vector read operation, the output of the raster scan position counter 85 on the bus 95 is coupled via the address multiplexer 81 to the RAM 66 to address sequentially each vector element 72 in a respective odd or even particular difference vector. As the value of each vector element 72 is accessed and placed on the data bus 88, the vector element values are accumulated by the accumulator 92 to produce an output value on a bus 96. For a monochrome raster display 58, each bit on the multibit bus 96 is ORed together by an OR gate 98 to produce a single bit the control instruction on line 68. As a result, the output on line 68 is asserted during a raster scan whenever the output of the accumulator 92 is non-zero. Reference is made to FIGS. 3 and 6 where the output of the accumulator 92 is shown for the vector associated with the raster line position 3. When the output of the accumulator is non-zero, the pen on a pen recorder, for example, is placed in the down position and results in the line segment 25 at raster line position 3 being drawn as is shown in FIG. 3.

For a multicolor or multilevel gray scale raster display 58, the raster data can be provided to the raster display directly from the multibit output of the accumulator 92. Thus, using a four-bit accumulator 92 and bus 96, for example, $2^4$ levels of gray scale can be controlled on the raster display 58. These levels of gray scale are useful for distinguishing the overlap of multiple channels of data on the raster as will be appreciated in view of the discussion below with respect to FIGS. 8–12. Moreover, the different levels of gray scale can be used for identifying individual channels of data on the raster display as is discussed below with respect to FIGS. 13–15.

Referring again to FIG. 7, during the vector read operation, the value of each vector element 72 is reset to zero after being read from the RAM 66 and sent to the accumulator 92. In the exemplary embodiment, this is accomplished using a reset buffer 102 connected to an input of the data multiplexer 94. The contents of the reset buffer 102 are fixed at "0". After each vector element 72 in an odd or even difference vector is accessed and its value sent to the accumulator 92, the data multiplexer 94 is used to direct the contents of the reset buffer 102 to the RAM 66 so that the contents of that vector element are zeroed prior to the next vector element being scanned from the RAM 66. In this manner, the vector elements 72 are continuously being reset in preparation of a write operation according to the exemplary buffering scheme. It will be appreciated, however, that other resetting and buffering schemes can be utilized without necessarily departing from the scope of the invention.

The raster scan position counter 85 is designed to count sequentially through a range of values corresponding to the raster scan positions on the raster scan display 58. Because of the "ping-pong" buffering scheme used in the RAM 66 according to the preferred embodiment, the raster scan position counter 85 counts sequentially from 0 to 8192 (corresponding to memory addresses 0 to 8K) and can therefore address both the odd and even difference vectors in the RAM 66 via the address multiplexer 81. In the exemplary embodiment, the most significant bit from the raster scan position counter 85 also serves as an odd/even flag bit which identifies whether the odd difference vector or the even difference vector is presently undergoing a vector read operating and is thus being outputted from the RAM 66. More particularly, the odd/even flag bit on line 110 is inverted via an inverter 112 and serves as a most significant address bit which is concatenated with the maximum and minimum data values provided on the data bus 75 to the input of the address multiplexer 81. Thus, when the raster scan position counter 85 is used to access the odd difference vector in the RAM 66 (i.e., memory addresses 0 to 4K–1), the minimum and maximum data values are used to access the even difference vector (i.e., memory addresses 4K to 8K–1), and vice versa.

Local control within the rasterizer 56 is provided by a control unit 120 as is shown in FIG. 7. For example, the control unit 120 receives, as an input, a status bit on line 122 from the raster position counter 85. Each time the output of the raster scan position counter 85 reaches the ending address of a difference vector during a vector read operation, e.g., at memory address 4K–1 and 8K–1, the status bit on line 122 is asserted. As a result, a line/status interrupt is outputted from the control unit 120 onto line 125 and is latched into a latch 127. The output of the latch 127 on line 130 is delivered to the raster display 58 and serves to increment the raster line position of the raster display 58 in preparation for the next raster scan and the next difference vector scanned from the RAM 66. In addition, the output on line 125 serves to reset the accumulator 92 back to "zero" for the next difference vector to be scanned from the RAM 66.

The control unit 120 also is responsible for controlling the status of the address multiplexer 81 and the data multiplexer 94 via lines 130 and 131, respectively, in order to carry out the above-mentioned procedures during vector read and write operations. Furthermore, the control unit 120 provides a write enable signal on line 135 to the RAM 66 at the appropriate times to carry out the above-described operations. The control unit 120 may consist of a gate array or some other control circuit including, for example, the CPU 60 itself. In the exemplary embodiment, the control unit preferably invokes a vector write operation at the end of each vector read operation upon which an entire difference vector has been outputted to the accumulator 92, although other procedures could be employed.

It will be appreciated that the present invention as described herein can be implemented in a variety of hardware and/or software designs. Furthermore, although the present invention has been described primarily in the context in which the difference vectors and raster lines are scanned vertically and from the lowest to highest raster scan position, it is equally possible to scan horizontally and/or from the highest to lowest raster scan position. In the case where the raster lines are scanned from the highest to lowest raster scan position, it may be desirable because of the accumulator 92 to decrement the vector element corresponding to the minimum data value plus one and increment the vector element corresponding to the maximum data value.

Moreover, it is not necessary that the vector elements in the difference vectors be incremented or decremented only by "one", but instead can be incremented or decremented by some other amount as desired.

Referring now to FIGS. 8–12, operation of the rasterization system 50 wherein two channels of image data are provided will now be described. Initially referring to FIG. 8, in particular, two overlapping analog waveforms 20 and 150 are shown which are to be displayed on the raster display 58. The waveform 20 on CHAN A is identical to that shown in FIG. 1. The waveform 150 on CHAN B is some other waveform provided as an input on a separate channel. Both waveforms are sampled and digitized individually using conventional techniques and result in the sets of image data values represented in FIG. 8 by the "X"s and "Δ"s, respectively.

The image data representing both waveforms is stored in the acquisition memory 52 (FIG. 5*a*) in groups of data values so as to be separately addressable based on the respective channel by the mix-max generator 54. The min-max generator 54 determines the min-max pair for each channel and group of data values using conventional techniques. The min-max pairs for the waveforms 20 and 150 as determined by the min-max generator 54 are provided in FIG. 9.

Using the above-described procedure for generating odd and even difference vectors, the CPU 60 delivers the min-max pair of data values for each channel to the rasterizer 56 to generate each difference vector. For example, the min-max pairs of (12,16) and (5,18) corresponding to the second group of data values for CHAN A and CHAN B, respectively, are inputted sequentially to the rasterizer 56. As a result, the vector elements at the memory addresses specified by the minimum data values 12 and 5 are incremented as is shown in FIG. 10 to produce the difference vector designated 2. Similarly, the vector elements at the memory addresses specified by the maximum data values plus one, i.e., 17 and 19, are decremented. The min-max pairs for additional channels would be handled in the same way, thereby enabling the rasterization system 50 to handle more than two channels.

Ultimately, the rasterizer 56 will generate and output from the RAM 66 in the manner described above the sequence of difference vectors 1–5 illustrated in FIG. 10. Again, the difference vectors provide control instructions to the raster display 58 and result in the two-channel raster image shown in FIG. 11. Most notably, as each difference vector is outputted from the RAM 66 to the accumulator 92 (FIG. 7), the output of the accumulator 92 on the bus 96 can take on values greater than one. For example, FIG. 12 illustrates the outputting of the difference vector 3 corresponding to the raster line position 3 in FIG. 11. As the vector elements are scanned from the RAM 66 and are accumulated, the output of the accumulator becomes "2" between the raster scan positions 4 and 6. The line segment between raster scan positions 4 and 6, as will be appreciated, represents the range where the individual raster line segments 25A and 25B overlap. Thus, the output value of the accumulator 92 can be provided to the raster display 58 directly from the bus 96 and can be used to control the intensity, gray scale level, color, etc., on the raster display 58. Such a variation in the optical characteristics of the raster display 58 where the individual line segments of the respective channels overlap make it easier to distinguish visibly such overlap as will be appreciated.

As is shown in FIG. 11, for example, the display elements where the line segments representing the respective waveforms 20 and 150 overlap are displayed in BOLD. This is accomplished, for example, by the raster display 58 receiving the output value "2" on the bus 96 during a given raster scan and causing the pen on the chart recorder to produce a BOLD line during such time. As is exemplified in FIG. 12, when the accumulator 92 output is "0", the pen output on the raster display 58 is false "F" and the pen does not contact the paper. When the accumulator 92 output is "1", the pen output on the raster display 58 is a first level true "T" and the pen contacts the paper to draw a line having a first gray scale level during the raster scan. Finally, when the accumulator 92 output is "2", the pen output is a second level true "T" and the pen contacts the paper to draw a line having a second gray scale level during the raster scan.

Numerous other variations are possible as will be appreciated. For example, the output of the accumulator 92 can be used to control the intensity of an electron beam during a raster scan on a luminescent type display, to control the color of the pen during a raster scan, etc. The number of levels of gray scale and/or colors provided by the rasterization system 50 typically will be a function of the output range of the accumulator 92 and the capabilities of the raster display 58 as will be appreciated.

The present invention as described in the exemplary embodiment utilizes simple and inexpensive circuitry, e.g., a RAM 66, a single position counter 85, a single increment/decrement circuit 79, and a single accumulator 92, regardless of the number of channels of image data. The length of each vector element in the memory increases only as the logarithm of the number of channels of image data, the maximum possible value of a vector element being that which would occur when each channel of image data causes the same vector element to be incremented.

According to another embodiment of the present invention, each channel of image data is assigned a unique binary identification code. The unique identification codes enable the display of the respective channels to be distinguished further on the raster display 58. More particularly, each channel is assigned a respective binary identification code $2^n$, e.g., 1, 2, 4, 8, 16, 32, etc. When generating the difference vectors, the values of the identification codes are used to increment/decrement the appropriate vector elements via the increment/decrement circuit 79 for each corresponding channel. Because the identification codes are unique and the summation of any combination of identification codes is unique to that particular combination, the difference vectors generated in the RAM 66 will enable individual channels to be distinguished on the raster display 58 via intensity, boldness, color, etc., as described more fully below.

For example the CHAN A waveform 20 shown in FIG. 8 may be assigned the identification code 1, and the CHAN B waveform the identification code 2. In the event there were to be additional channels, such channels may have the identification codes 4, 8, etc. The rasterizer 56 of FIG. 7 is modified such that the increment/decrement circuit 79 increments/decrements the appropriate vector element as described above by an amount equal to the identification code corresponding to the channel of data providing the min-max pair. In the exemplary embodiment, the CPU 60 provides the increment/decrement circuit 79 with a control signal via line 150 (shown as dotted) which identifies the channel from which the min-max pair is being provided during the generation of a given difference vector. Based on the control signal on line 150, in combination with the control signal on line 77, the increment/decrement circuit 79 is instructed whether to increment or decrement a particular vector element and by what amount as will be appreciated.

Referring now to FIG. 13, shown is the set of difference vectors generated in the RAM 66 in the above-described manner using the identification codes 1 and 2 for CHAN A and CHAN B, respectively. Note that the min-max pairs for the CHAN A data (FIG. 9) cause the corresponding vector elements to be incremented/decremented by "1". Similarly, the min-max pairs for the CHAN B data cause the corresponding vector elements to be incremented/decremented by "2".

FIG. 14 illustrates the output of the accumulator 92 for the difference vector 2 which, as before, is associated with the raster line position 2. The different values of the accumulator output on line 96 represent different levels of gray scale, colors, etc., and can be provided directly to the raster display 58 for providing control thereof. As an example, the raster line segments generated based on the difference vector 2 are shown in FIG. 15. Where the line segments overlap (e.g., between the raster scan positions corresponding to the address locations 12 to 16), an accumulator output equal to "3" which corresponds to a gray scale level $T_3$ is provided on the raster display 58. The gray scale level $T_3$ is unique to the overlap of the channels having identification codes of 1 and 2 (where 1+2=3). Thus, it will be apparent from the $T_3$ level of gray scale on the raster display that the specific channels identified by the codes 1 and 2 are actually overlapping. This feature is particularly useful in embodiments including three or more channels. As previously stated, the sum of respective identification codes of overlapping channels will produce a gray scale level unique to the overlap of those particular channels. In regions where the channels do not overlap (e.g., CHAN 2 as designated by the gray scale level $T_2$ in FIG. 15), the level of gray scale will be indicative of the particular channel.

It will be appreciated that instead of controlling the gray scale level, the output of the accumulator 92 can be used to represent the individual channels with unique colors based on the identification codes. Furthermore, the overlapping of channel segments can be displayed in additional unique colors based on the unique sums of the identification codes for two or more overlapping channels.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. An apparatus for processing image data comprising a plurality of groups of data values, said apparatus comprising:

memory means for storing difference vectors for controlling an output of a display;

means for generating each of said difference vectors as a function of a minimum data value and a maximum data value included within a corresponding group of said data values; and means for outputting said difference vectors from said memory means to produce an image on a display, said display comprising an M-by-N array of display elements, and said difference vectors comprising M difference vectors each comprising N vector elements, said means for generating comprising means for incrementing a value of a vector element corresponding to said minimum data value in said difference vector, and means for decrementing a value of a vector element corresponding to said maximum data value in said difference vector.

2. The apparatus of claim 1, wherein said memory means comprises a random access memory (RAM).

3. The apparatus of claim 1, wherein each of said difference vectors represents at least one line segment to be produced on said display.

4. The apparatus of claim 3, wherein a value of each of said vector elements is operative to control a desired optical characteristic of a corresponding display element on said display.

5. The apparatus of claim 4, wherein said optical characteristic comprises at least one of color and intensity.

6. The apparatus of claim 1, wherein said data comprises data values from a plurality of channels.

7. The apparatus of claim 1, wherein said means for outputting comprises an accumulator for providing a control output to said display as a function of a summation of said values of said vector elements for each of said difference vectors.

8. The apparatus of claim 7, wherein said means for outputting further comprises a scan counter which provides an address input to said memory means to output said difference vectors sequentially from said memory means.

9. The apparatus of claim 7, said means for outputting comprising means for representing multiple levels of gray scale.

10. An apparatus for processing image data comprising a plurality of groups of data values, said apparatus comprising:

means for generating a difference vector for controlling an output of a display as a function of a minimum data value and a maximum data value from a corresponding group of said data values;

memory means for storing said difference vector; and means for outputting said difference vector from said memory means to produce image information on a display, wherein said difference vector represents at least one raster line to be produced on said display, said raster line comprises N display elements, and said difference vector comprises N vector elements which are operative to control a desired optical characteristic of a corresponding display element, said means for generating comprising means for incrementing a value of a vector element corresponding to said minimum data value in said difference vector, and means for decrementing a value of a vector element corresponding to said maximum data value in said difference vector.

11. The apparatus of claim 10, wherein said memory means comprises a random access memory (RAM).

12. The apparatus of claim 10, wherein said optical characteristic comprises at least one of color and intensity.

13. The apparatus of claim 10, wherein each of said groups comprise data values from a plurality of channels.

14. The apparatus of claim 13, wherein each of said plurality of channels is identified by a unique identification code, and said means for incrementing and said means for decrementing increment and decrement, respectively, by an amount which is a function of said unique identification codes.

15. The apparatus of claim 10, wherein said means for outputting comprises an accumulator for providing a control output to said display as a function of a summation of said values of said difference vector.

16. The apparatus of claim 15, said means for outputting comprising means for representing multiple levels of gray scale.

17. The apparatus of claim 16, wherein said multiple levels of gray scale are representative of overlapping channels of said image data.

* * * * *